United States Patent [19]

Parker

[11] Patent Number: 4,975,504

[45] Date of Patent: Dec. 4, 1990

[54] ISOTERPINOLENE-MALEIC ANHYDRIDE COPOLYMERS

[75] Inventor: David W. Parker, Holland, Pa.

[73] Assignee: Union Camp Corporation, Wayne, N.J.

[21] Appl. No.: 336,936

[22] Filed: Apr. 12, 1989

Related U.S. Application Data

[63] Continuation-in-part of Ser. No. 191,936, May 9, 1988, abandoned.

[51] Int. Cl.$^5$ .............................................. C04F 32/00
[52] U.S. Cl. ................................. 526/238.3; 530/214; 526/219.6; 526/232.1; 526/232
[58] Field of Search ...................... 530/214; 526/238.3, 526/219.6, 232.1, 232

[56] References Cited

U.S. PATENT DOCUMENTS

| | | | |
|---|---|---|---|
| 1,978,598 | 10/1934 | Peterson | 260/101 |
| 1,993,026 | 3/1935 | Littmann | 260/101 |
| 1,993,036 | 3/1935 | Humphrey | 260/101 |
| 2,067,859 | 1/1937 | Peterson | 260/101 |
| 2,080,436 | 5/1937 | Peterson | 260/101 |
| 2,118,925 | 5/1938 | Humphrey | 260/101 |
| 2,126,944 | 8/1938 | Billing | 260/101 |
| 2,241,341 | 5/1941 | Ender | 260/101 |
| 2,353,927 | 7/1944 | Pickett | 260/101 |
| 2,354,776 | 1/1944 | Rummelsburg | 260/101 |

Primary Examiner—John Kight, III
Assistant Examiner—Dennis R. Daley
Attorney, Agent, or Firm—Edward J. Sites

[57] ABSTRACT

Copolymerization of isoterpinolene with maleic anhydride, preferably in the presence of a free radical initiator such as AIBN, to form high molecular weight (weight average molecular weight over 1000) polymers is disclosed. The polymerization may be conducted at a temperature up to about 190° C., preferably in the range of about 40° to 130° C., preferably in the presence of a polar solvent.

22 Claims, No Drawings

ISOTERPINOLENE-MALEIC ANHYDRIDE COPOLYMERS

This application is a continuation in part of copending Pat. application Ser. No. 191,936 filed May 9, 1988, now abandoned.

BACKGROUND OF THE INVENTION

This invention relates to terpene polymers and more particularly to high weight average molecular weight isoterpinolene-maleic anhydride copolymers.

Turpentine, turpentine distillation cuts, and acid-isomerized turpentine are economical sources of ten-carbon olefins and di-olefins called terpenes. The electron-rich unsaturation present in terpenes makes them attractive coreactants with electron deficient olefins, e.g. maleic anhydride, in Diels-Alder and Ene reactions. An early exploitation of this chemistry was disclosed by Peterson in U.S. Pat. No. 1,993,031. Peterson reacted turpentine distillates, consisting of alpha-pinene, beta-pinene, dipentene and terpinolene with maleic anhydride at a temperature in the range of about 150° to 200° C. The products of these reactions are referred to as soft resins and are believed to have been 1:1 and 1:2 terpene:maleic anhydride addition products which have molecular weights of 234g/mol and 322g/mol, respectively, and will be known hereinafter as "terpene maleic anhydride adducts." These low molecular weight adducts found early utility as components in alkyd resins because of their advantageous solubility behavior, the flexibility they provided in formulating alkyd resins, and their low cost.

Alkyd resins based on terpene maleic anhydride adducts have been incorporated into coating and varnish formulations. However, because the terpene adducts are of low molecular weight and are less reactive toward chain-extending polyols than other alkylidene diacids, the derived coatings have relatively poor film strength, poor heat resistance, and elevated water sensitivity compared to coatings made from other polymers. If a method could be found whereby high molecular weight polymers formed between terpenes and maleic anhydride could be prepared, it is expected that inks, varnishes, paints and coatings based on these polymers would show improved properties.

Attempts to increase the molecular weight of reaction products between terpenes and maleic anhydride are frustrated by the preference of most terpenes to undergo Ene and Diels-Alder reactions with maleic anhydride at elevated temperatures. The tendency of many terpenes to undergo isomerization in the presence of even a trace amount of acid further complicates the reaction chemistry of terpenes and maleic anhydride. Non-conjugated terpenes are frequently seen to isomerize to a conjugated form amenable to Diels-Alder reactions.

In U.S. Pat. Nos. 4,046,748 and 4,107,420, Schluenze teaches that the addition of controlled amounts of iodine to a reaction mixture comprising maleic anhydride and non-conjugated monocyclic terpene(s) will increase the ratio of diadducts (two maleic anhydrides react with one terpene) to monoadducts (one maleic anhydride reacts with one terpene). In no case does Schluenze indicate that products with molecular weights higher than that of diadduct (332g/mol) are formed under any of the reaction conditions disclosed. Apparently, the addition of iodine encourages various Ene and Diels-Alder reactions to occur, but not polymerization.

Other descriptions of terpene maleic anhydride adductions and diadductions, derivatives of the (di)adducts, as well as uses for the (di)adducts and derivatives are disclosed in several patents and publications, including U.S. Pat. Nos. 3,043,789, 4,055,576 and U.S. Pat. No.2,230,230.

The preparation of high molecular weight polymers formed from terpenes and maleic anhydride has been reported to occur in cases where additional reactive comonomers are present. In U.S. Pat. No. 4,172,861 Li et al. disclose that materials with high softening temperatures can be formed from the mixture comprising styrene-butadiene rubber, styrene, beta-pinene, maleic anhydride, and a free-radical initiator. Li et al. indicate that limonene can be used in place of beta-pinene, but they neither indicate nor claim that useful materials can be formed under their reaction conditions in the absence of styrene and styrene-butadiene rubber.

U.S. Pat. No. 2,383,399 to Lundquist discloses the preparation of terpolymers from a reaction mixture comprising maleic anhydride, terpene(s), and a third comonomer "capable of rapid and exothermic polymerization with maleic anhydride". This third comonomer is preferably styrene. The reaction of styrene, maleic anhydride and dipentene (racemic limonene) proceeds to give terpolymer in 75% yield, while the same reaction run in the absence of styrene leads to an unidentified polymer in a yield of 37%. The reaction of styrene, maleic anhydride and camphene proceeds to give terpolymer in 34% yield, while the same reaction run in the absence of styrene did not form polymer in a quantity sufficient for isolation. It is broadly claimed that all terpenes with the formula $C_{10}H_{16}$ and having not more than two double bonds per molecule may be used in this terpolymerization. No claim is made for the preparation of copolymers between terpenes and maleic anhydride.

German Pat. No. 1,694,829 serves as another example of the preparation of terpolymers containing terpenes, maleic anhydride and reactable termonomers. The formation of a polymer in the absence of a reactable termonomer is not indicated.

Little success has heretofore been achieved in the preparation of high molecular weight polymers made solely from terpenes and maleic anhydride. One approach to preparing high molecular weight materials consisting solely of terpene and maleic anhydride has been to prepare a terpene homopolymer by methods well known in the art and in a subsequent operation attach maleic anhydride onto the preformed homopolymer, in some instances in the presence of an organic peroxide. Examples of this general approach can be found in disclosures made in U.S. Pat. Nos. 3,193,449, 3,375,130, and U.S. Pat. No. 4,670,504.

Such maleinated terpene homopolymers should be distinguished from the object of this invention, which, as will be described in more detail, is the copolymer formed between a terpene and maleic anhydride wherein both the terpene and maleic anhydride contribute to the backbone of the polymer.

Direct copolymerizations of terpenes with maleic anhydride are almost without precedent. The free-radical induced copolymerization between limonene and maleic anhydride has been studied recently by Doiuchi et al. as described in *European Polymer Journal* Vol. 17, pp. 961–968, (1981). Although mostly interested in the mechanism of the copolymerization, they reported that their highest yield of copolymer occurred after 72 hours of reaction and was only 13%. A detailed study of the copolymer revealed that it was comprised of limonene and maleic anhydride in the molar ratio of 1:2 and had a number average molecular weight of only 1300. W. J. Bailey, in *Contemporary Topics in Polymer Chemistry*, M. Shen, Ed., Vol. 3, p. 49, Plenum Press, New York (1979) reports that beta-pinene will undergo an alternating copolymerization with maleic anhydride. Bailey makes no mention of the details and yields of this process and does not describe the formation of copolymers between maleic anhydride and any terpene other than beta-pinene.

Successful copolymerization of a terpene and maleic anhydride in high yield to a resin of high melt point and high molecular weight evidently depends on the careful selection of the terpene isomer. Terpenes with cisoid conjugated double bonds, for example aloha-terpinene, will prefer to undergo rapid Diels-Alder adduction. Those with isolated double bonds may undergo limited copolymerization, as is seen, for example, with limonene, or are inert, as is the case with camphene, or isomerize under the reaction conditions, as occurs with terpinolene.

SUMMARY OF THE INVENTION

It is herein disclosed that a high yield preparation of a high molecular weight copolymer between maleic anhydride and terpenes can be achieved when the terpene isomer is selected to have conjugated double bonds capable of copolymerizing rapidly with maleic anhydride yet incapable of adducting maleic anhydride via the Diels-Alder reaction. This is the case for para-mentha-2(3), 4(8)-diene, commonly known as isoterpinolene. No other examples of polymeric materials being made from isoterpinolene are known to the inventor.

This invention therefore relates to polymers which comprise the reaction product of approximately equimolar quantities of isoterpinolene and maleic anhydride, which polymers have a weight average molecular weight of at least about 1000. These polymers can be prepared in high yields, and their properties enable their use in various applications. This invention also relates to terpolymers comprised mainly of isoterpinolene and maleic anhydride, and to methods for preparing the polymers of this invention.

DETAILED DESCRIPTION OF THE INVENTION

The terpene compound from which the copolymers of this invention are prepared is isoterpinolene (i.e., para-mentha -2(3), 4(8)-diene), which is a conjugated diene having the structure:

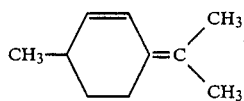

Isoterpinolene is not appreciably available through distillation of turpentine from pine trees. It can, however, be isolated by distillation from a mixture of terpene compounds which are generated upon acid catalyzed isomerization of turpentine. To prepare the copolymers of this invention, it is preferred to use isoterpinolene of good purity. Certain impurities can function as chain transfer agents or chain terminators and their presence can therefore contribute to a lowering of copolymer molecular weight and a decrease in the reaction rate.

The maleic anhydride employed in this invention is of standard commercial quality and is available from several chemical supply houses.

In forming the copolymers of this invention, isoterpinolene is contacted with maleic anhydride, preferably in the presence of an effective amount of at least one free radical polymerization initiator, to form unexpectedly high molecular weight copolymers. It is believed that the copolymer is formed through an alternating addition mechanism, with 1,4-addition of maleic anhydride to the terpene. The structure therefore consists of a substantial number of 1:1 alternating units as schematically shown below:

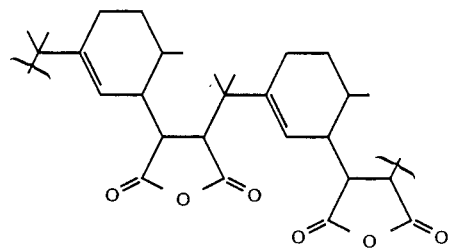

Typically, equal molar quantities of isoterpinolene and maleic anhydride are utilized. Deviation from the use of equal molar quantities influences the rate of the copolymerization, the molecular weight of the copolymer, and the ease of copolymer isolation, but does not greatly affect the composition of the copolymer. Thus, when the polymers of this invention are described as comprising the reaction product of substantially equimolar quantities of isoterpinolene and maleic anhydride, it is intended to describe the relative quantities of the monomers in the copolymer rather than the relative quantities of monomers which are contacted to prepare the copolymer.

The polymers of this invention can further comprise one or more additional monomers capable of polymerizing with maleic anhydride. Such monomers preferably comprise not more than 50 mole% of the polymer, and the resulting polymers preferably comprise at least about 25 mole% isoterpinolene and at least about 25 mole% maleic anhydride. Monomers capable of polymerizing with maleic anhydride are well known in the art and include, for example, styrene, acrylonitrile, and acrylic acid; terpenes capable of reacting with maleic anhydride such as beta-pinene and beta-phellandrene; and abietic acids and esters thereof.

An effective amount of free radical polymerization initiator will generally range from about 0.01 to 2 weight percent, preferably about 0.1 to 1 weight percent (based on total weight of comonomers). The preferred initiator is AIBN, i.e., 2,2'-azobis(2-methylpropanenitrile). Other free radical initiators can be used including peroxides, e.g., benzoyl peroxide, ketone dialkyl peroxide, and dicumyl peroxide.

Although the copolymerization can be conducted neat, it is preferable to conduct the copolymerization in the presence of a solvent, e.g., an aliphatic or aromatic hydrocarbon, or an ester or ether solvent. Most preferred solvents include toluene, ethyl acetate or tetrahydrofuran. To the extent the solvent dilutes the comonomers, the amount of solvent used will influence the rate of reaction. The amount of solvent can also influence the molecular weight of the product by functioning as a chain transfer agent.

The temperature at which the copolymerization reaction is run is largely determined by the choice of free-radical initiator. Typically one selects a temperature such that the half-life of the initiator is about one hour. When AIBN is the initiator, a temperature of 70° C. is conveniently employed, while copolymerizations initiated by dicumyl peroxide are typically run at 130° C. Ordinarily the reaction temperature will be within the range from room temperature to about 190° C., preferably about 40° to 130° C., and more preferably about 60° to 80° C.

The molecular weights of the copolymers of this invention are higher than ever previously reported for the product of a reaction solely between maleic anhydride and a terpene. Copolymers with a weight average molecular weight as measured by gel permeation chromatography of at least about 1000, preferably at least about 5000, may be prepared according to this invention. Indeed, copolymers with a weight average molecular weight as high as 26000 have been obtained in the absence of chain transfer and chain terminating agents.

The copolymers of this invention have softening points (i.e., capillary melting point) of at least about 120° C., more typically, greater than 170° C., and are thermally stable to about 250° C. A glass transition temperature in excess of 175° C. has been observed for purified, high molecular weight copolymer. The product polymer generally contains 72% carbon and 7% hydrogen, as expected for a copolymer made from equal molar quantities of terpene and maleic anhydride.

A reaction competitive to the desired copolymerization is frequently seen to occur. This is the adduction reaction between isoterpinolene and maleic anhydride to produce 1:1 and 1:2 terpene maleic anhydride adducts of molecular weight less than 400. Amounts of these adducts can be minimized by using lower temperatures, shorter reaction times, and/or the use of a polar solvent, e.g., ethyl acetate. When undesirable terpene maleic anhydride adducts are present, pure polymer can be recovered from the product mixture through, for example, precipitation.

The invention will now be described in connection with the following examples wherein parts and percentages are by weight and temperatures are in degrees C. unless indicated. Molecular weights were measured by gel permeation chromatography using a refractive index detector, with retention times referenced to polystyrene of known molecular weight. The isoterpinolene used in the following examples, unless otherwise indicated, was of 85% purity, with terpinolene constituting 12% of the feed.

EXAMPLE 1

A three-necked flask was fitted with a reflux condenser, mechanical stirrer, and additional funnel, and blanketed with a nitrogen atmosphere. The flask was charged with 16 g isoterpinolene, 11g maleic anhydride, 17 g toluene, and 0.0287 g AIBN. This mixture was heated with stirring to 75° C. for six hours, during which time the copolymer precipitated from solution. At the conclusion of the reaction the copolymer was dissolved in tetrahydrofuran and reprecipitated by addition to pentane. A light-colored material was recovered in a yield of 12 g, which consisted of a mixture of 92% copolymer and 8% terpene-maleic anhydride adducts. This mixture had a glass transition temperature of 171° C. and the copolymer had a weight average molecular weight of 26,000. Control reactions conducted in the absence of either isoterpinolene or maleic anhydride yielded no polymeric product.

EXAMPLE 2

The reaction apparatus of Example 1 was assembled and the flask charged with 18.4 g isoterpinolene (95% isoterpinolene, 5% terpinolene), 11.4 g maleic anhydride, 27.1 g para-xylene, and 0.060 g dicumyl peroxide. This mixture was heated at 95° C. for 21 hours, during which time the forming copolymer precipitated from solution. At the conclusion of the reaction, the copolymer was dissolved in THF and reprecipitated by pouring it into a pentane solution of the supernatant of the original reaction mixture. Recovered was 17.7 g of a mixture of 85% copolymer and 15% terpene maleic anhydride adducts. This mixture had a glass transition temperature of 123° C., and the copolymer had a weight average molecular weight of 11200.

EXAMPLE 3

The procedure of Example 1 was repeated except butyl acetate was used as the solvent instead of toluene. The product had a weight-average molecular weight of 13,300 and a melting point of 167° C. and contained 2.6% adducts of maleic anhydride.

EXAMPLE 4

The procedure of Example 1 was repeated except para-cymene was used as solvent in place of para-xylene, and dicumyl peroxide was used as initiator in place of AIBN. The product had a weight-average molecular weight of 7700 and a melting point of 204° C. and contained 7.9% adducts.

Following the teachings herein, it can be seen that relatively high molecular weight copolymers of maleic anhydride and iso-terpinolene can be prepared under mild conditions.

The copolymers of this invention have a reactive character due to the presence of the anhydride units and residual unsaturation in the chain. Both the anhydride units and the points of unsaturation are capable of undergoing reactions typical of such units in a polymer to effectively modify the character of the copolymer. Methods for achieving such reactions, for example partial or complete esterification of the anhydride functionality, are well known in the art.

The following uses are among those in which the polymers prepared according to this invention may be applied: ink resins, scale inhibitors, epoxy curing agents, and components of coating compositions. Methods of employing polymers in the aforementioned uses are well known to those skilled in the art.

What is claimed is:

1. A polymer comprising the reaction product of approximately equimolar quantities of isoterpinolene and maleic anhydride, said polymer having a weight average molecular weight of at least about 1000.

2. The polymer of claim 1 which comprises alternating chain moieties derived from isoterpinolene and maleic anhydride.

3. The polymer of claim 1 having a weight average molecular weight of at least about 5000.

4. The polymer of claim 1 having a weight average molecular weight of at least about 16000.

5. The polymer of claim 1 comprising repeating units of the formula:

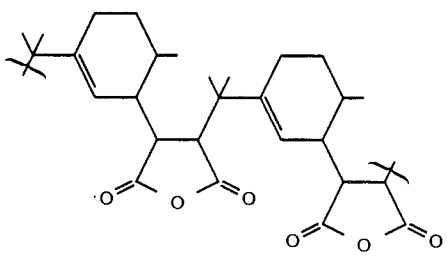

6. The polymer of claim 5 having a weight average molecular weight of at least about 5000.

7. The polymer of claim 6 having a weight average molecular weight of at least about 16000.

8. A polymer comprising the reaction product of isoterpinolene, maleic anhydride and one or more additional monomers capable of polymerizing with maleic anhydride, said polymer having a weight average molecular weight of at least about 1000.

9. The polymer of claim 8 in which said one or more additional monomers comprise up to 50% of the total moles of isoterpinolene, maleic anhydride plus said additional monomers.

10. The polymer of claim 8 in which said one or more additional monomers are selected from styrene, acrylonitrile, acrylic acid, methacrylic acid, esters of acrylic acid, esters of methacrylic acid, beta-pinene, beta-phellandrene and abietic acids or esters thereof.

11. A process for making the polymer of claim 1 which comprises contacting under reaction conditions approximately equimolar amounts of isoterpinolene with maleic anhydride.

12. The process of claim 11 in which said copolymerization is conducted in the presence of an effective amount of at least one free radical polymerization initiator.

13. The process of claim 12 wherein about 0.01 to 5 weight percent, based on total weight iso-terpinolene and maleic anhydride, of said at least one free radical polymerization initiator is present.

14. The process of claim 13 wherein about 0.01 to 1 weight percent, based on total weight iso-terpinolene and maleic anhydride, of said at least one free radical polymerization initiator is present.

15. The process of claim 12 wherein said free radical polymerization initiator is selected from the group consisting of 2,2-azobis(2-methylpropanenitrile), benzoyl peroxide and dicumyl peroxide.

16. The process of claim 15 wherein the free radical polymerization initiator is 2,2-azobis (2-methylpropionitrile).

17. The process of claim 11 wherein the copolymerization is carried out at a temperature in the range of about 40° to 130° C.

18. The process of claim 11 wherein the copolymerization is conducted in the presence of a solvent.

19. The process of claim 18 where the solvent is selected from the group consisting of toluene, ethyl acetate and tetrahydrofuran.

20. A process for making the polymer of claim 8 comprising contacting under reaction conditions appropriate quantities of isoterpinolene, maleic anhydride and one or more additional monomers capable of polymerizing with maleic anhydride.

21. The process of claim 20 where said one or more additional monomers comprise up to about 50 mole% of the total moles of isoterpinolene, maleic anhydride plus said additional monomers.

22. The process of claim 11 wherein iso-terpinolene and maleic anhydride are contacted in substantially equal molar amounts in the presence of a solvent and in the presence of about 0.1 to 1 weight percent of 2,2-azobis(2-methylpropanenitrile) at a temperature in the range of about 60° to 80° C.

* * * * *